(12) United States Patent
Beach et al.

(10) Patent No.: US 11,945,478 B2
(45) Date of Patent: Apr. 2, 2024

(54) HIGH-INTEGRITY OBJECT DETECTION SYSTEM AND METHOD

(71) Applicant: Ground Transportation Systems Canada Inc., Toronto (CA)

(72) Inventors: David Beach, Toronto (CA); Alon Green, Toronto (CA); Walter Kinio, Toronto (CA)

(73) Assignee: GROUND TRANSPORTATION SYSTEMS CANADA INC., Ontario (CA)

( * ) Notice: Subject to any disclaimer, the term of this patent is extended or adjusted under 35 U.S.C. 154(b) by 685 days.

(21) Appl. No.: 17/100,380

(22) Filed: Nov. 20, 2020

(65) Prior Publication Data
US 2021/0146978 A1    May 20, 2021

Related U.S. Application Data

(60) Provisional application No. 62/938,109, filed on Nov. 20, 2019.

(51) Int. Cl.
*B61L 23/04*    (2006.01)
*B61L 15/00*    (2006.01)
(Continued)

(52) U.S. Cl.
CPC ......... *B61L 23/041* (2013.01); *B61L 15/0072* (2013.01); *B61L 25/025* (2013.01);
(Continued)

(58) Field of Classification Search
CPC .. B61L 23/041; B61L 25/025; B61L 15/0072; G01S 13/88; G01S 2013/932;
(Continued)

(56) References Cited

U.S. PATENT DOCUMENTS 8,712,610 B2    4/2014    Kumar
8,773,535 B2    7/2014    Zhang
(Continued)

FOREIGN PATENT DOCUMENTS

CN    103733077 A    *    4/2014    ............ B61L 25/021
CN    108700876 A    *    10/2018    ............... B60Q 1/26
(Continued)

OTHER PUBLICATIONS

Aryal, M., "Object Detection, Classification, and Tracking for Autonomous Vehicle" (2018), Masters Theses, Graduate Research and Creative Practice, Grand Valley State University.
(Continued)

*Primary Examiner* — S. Joseph Morano
*Assistant Examiner* — James William Jones
(74) *Attorney, Agent, or Firm* — HAUPTMAN HAM, LLP (57) ABSTRACT

A method and system include receiving positioning and motion information from one or more positioning and motion devices on a vehicle on a guideway, based on the positioning and motion information, receiving information from a database on the vehicle, the information comprising track geometry information and infrastructure information corresponding to the guideway, using the track geometry information and positioning and motion information to determine a path of the guideway and a trajectory of the vehicle along the path, receiving data from one or more electromagnetic sensors on the vehicle, and detecting an object by using the trajectory, the infrastructure information, and the information from the one or more electromagnetic sensors.

20 Claims, 10 Drawing Sheets

(51) Int. Cl.
*B61L 25/02* (2006.01)
*G01S 13/88* (2006.01)
*H04W 4/02* (2018.01)
*B61K 9/08* (2006.01)
*G01S 13/931* (2020.01)
*H04L 67/12* (2022.01)

(52) U.S. Cl.
CPC ............. *G01S 13/88* (2013.01); *H04W 4/025* (2013.01); *H04W 4/026* (2013.01); *H04W 4/027* (2013.01); *B61K 9/08* (2013.01); *G01S 2013/932* (2020.01); *G01S 2013/9322* (2020.01); *G01S 2013/9328* (2013.01); *H04L 67/12* (2013.01)

(58) Field of Classification Search
CPC ..... G01S 2013/9322; G01S 2013/9328; H04L 67/12; H04W 4/026; H04W 4/027; H04W 4/025; B61K 9/08
See application file for complete search history.

(56) References Cited

U.S. PATENT DOCUMENTS

| | | | |
|---|---|---|---|
| 10,086,857 | B2 | 10/2018 | Puttagunta et al. |
| 10,147,195 | B2 | 12/2018 | Schulte |
| 10,362,293 | B2 | 7/2019 | Mesher |
| 10,773,739 | B2 | 9/2020 | Schaefer-Enkeler et al. |
| 2003/0222981 | A1 | 12/2003 | Kisak et al. |
| 2005/0060069 | A1* | 3/2005 | Breed .................... G08G 1/166 701/408 |
| 2005/0137786 | A1* | 6/2005 | Breed .................... G01S 19/50 701/482 |
| 2006/0098843 | A1 | 5/2006 | Chew |
| 2016/0249040 | A1* | 8/2016 | Mesher ............... H04N 13/189 |
| 2017/0057527 | A1 | 3/2017 | Kono |
| 2017/0158175 | A1* | 6/2017 | Fairfield ......... B60W 60/00276 |
| 2017/0305442 | A1* | 10/2017 | Viviani .................. B61D 15/12 |
| 2018/0075746 | A1* | 3/2018 | Jiang .................... H04B 7/0617 |
| 2018/0339720 | A1* | 11/2018 | Singh ..................... G06T 7/001 |
| 2019/0039633 | A1 | 2/2019 | Li |
| 2019/0106136 | A1 | 4/2019 | Nishinaga et al. |

FOREIGN PATENT DOCUMENTS

| | | | | |
|---|---|---|---|---|
| DE | 102006007788 | A1 | 8/2007 | |
| DE | 102018201531 | A1 | 8/2019 | |
| DE | 102018213015 | A1 * | 2/2020 | ............. G01S 13/46 |
| DE | 112018007659 | T5 * | 3/2021 | ............. G06T 7/246 |
| EP | 3265361 | B1 | 9/2019 | |
| GB | 2579415 | A | 6/2020 | |
| WO | WO-2005065272 | A2 * | 7/2005 | ......... H04N 13/0207 |
| WO | 2015150340 | A1 | 10/2015 | |
| WO | 2016042352 | A1 | 3/2016 | |
| WO | 2017174155 | A1 | 10/2017 | |
| WO | 2018091508 | A1 | 5/2018 | |
| WO | 2018104454 | A2 | 6/2018 | |
| WO | 2018158712 | A1 | 9/2018 | |
| WO | WO-2020219734 | A1 * | 10/2020 | ............ B25J 9/1666 |

OTHER PUBLICATIONS

Florez et al., S.A.R., "Multi-modal object detection and localization for high integrity driving assistance" Machine Vision and Applications, Springer Verlag, 2014, 25 (3), pp. 583-598.

International Search Report and Written Opinion issued in corresponding International Application No. PCT/IB2020/060992, dated Jan. 25, 2021, Canadian Intellectual Property Office, Quebec, Canada, pp. 1-8.

Extended European Search Report issued in corresponding European Application No. 20891020.8, dated Dec. 19, 2023, pp. 1-9.

* cited by examiner

HIGH-INTEGRITY OBJECT DETECTION SYSTEM AND METHOD

PRIORITY CLAIM

The present application claims the priority of U.S. Provisional Application No. 62/938,109, filed Nov. 20, 2019, which is incorporated herein by reference in its entirety.

BACKGROUND

Safe operation of a vehicle includes detecting potentially hazardous objects and, if needed, taking action in response to detecting such an object. Vehicle control is achieved through various combinations of human and automated activity, and in some cases is fully automated. Safety is particularly important for vehicles that operate on guideways, e.g., trains that run on tracks.

Object detection often includes using sensors or other devices to generate data related to the environment external to the vehicle. Such data is frequently obtained through on-board camera, radio detecting and ranging (radar), and light detecting and ranging (lidar) equipment.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

In various embodiments, a system and method of high-integrity object detection include combining on-board stored information with real-time data to determine a vehicle path and trajectory, and using the trajectory, stored information, and sensor data to detect infrastructure and non-infrastructure objects. Compared to other known approaches, the system and method enable high-integrity object detection with reduced complexity, processing overhead, and characterization uncertainty.

Figure 1:
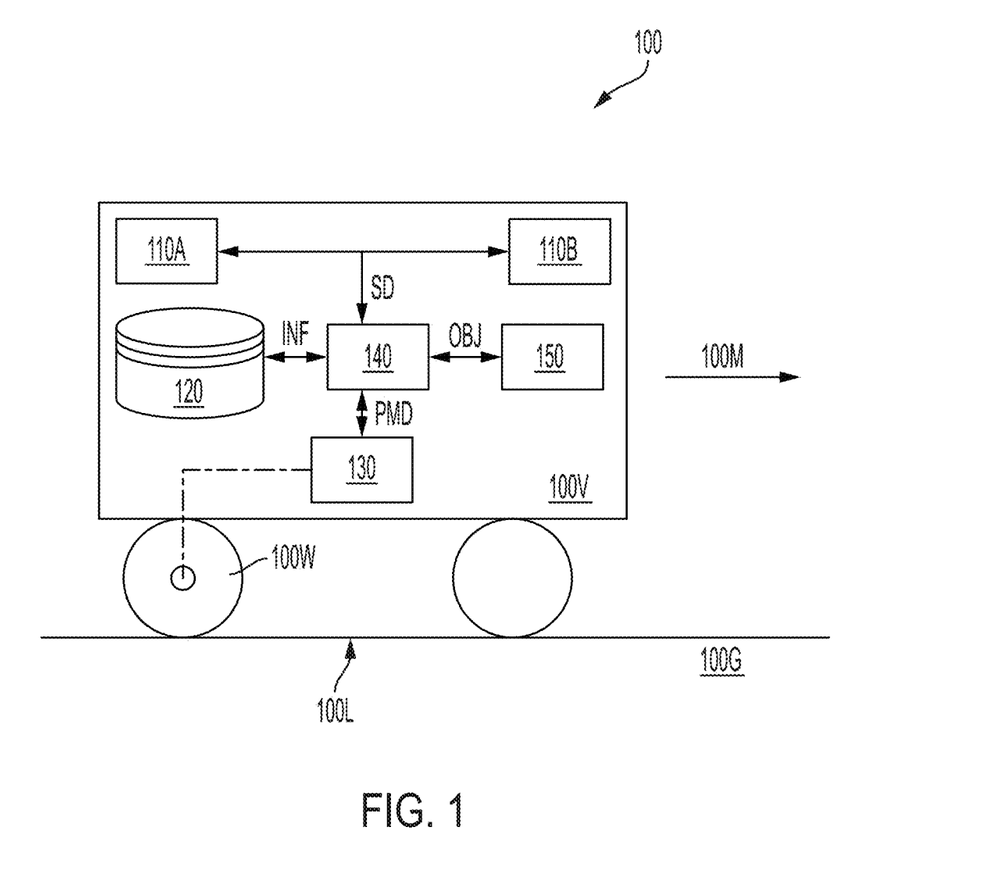
FIG. 1 is a schematic drawing illustrating a system for high-integrity object detection, in some embodiments.

FIG. 1 is a schematic drawing illustrating a system 100 for high-integrity object detection, in some embodiments. System 100, also referred to as on-board system 100 in some embodiments, includes some or all of sensors 110A and 110B, a storage device 120, position and motion devices 130, a logic unit 140, and a processor 150. In addition to system 100, FIG. 1 depicts a vehicle 100V including system 100, a wheel 100W, a guideway 100G, a location 100L, and a motion direction 100M. In various embodiments, one or more of sensors 110A, 110B, position and motion devices 130, or controller 150 is included in vehicle 100V instead of system 100.

Vehicle 100V is a path-constrained vehicle, e.g., a rail-based train car, a plurality of rail-based vehicles, e.g., a train, a roadway-constrained vehicle, e.g., a car, truck, or tractor-trailer, or other vehicle capable of movement along one or more predetermined paths such as a railway or roadway.

Guideway 100V is one or more tracks (or rails), magnetic levitation (maglev) structures, roadways, or other structures configured to provide the one or more predetermined paths along which vehicle 100V operates.

Sensors 100A and 110B, referred to collectively as sensors 110, are one or more sensing devices configured to generate sensor data SD representative of an environment in the vicinity of vehicle 100V, referred to as a field of regard (FOR) in some embodiments. In various embodiments, sensors 110 include one or more of a camera, radar, lidar, or similar device configured to generate sensor data SD based on received electromagnetic radiation, e.g. radiation reflected or emitted from one or more objects in the environment responsive to incidental radiation or to radiation and/or a signal projected from the sensors 110. In some embodiments, sensors 110 are referred to as electromagnetic sensors 110. In various embodiments, electromagnetic radiation includes one or more of visible spectrum radiation, infrared radiation, or radiation of one or more other frequencies capable of representing the environment in the vicinity of vehicle 100V.

In the embodiment depicted in FIG. 1, sensors 110 include first sensors 110A at a first on-board location on vehicle 100V and sensors 110B at a second on-board location on vehicle 100V, and are thereby configured to generate sensor data SD. In various embodiments, sensors 110 are otherwise configured, e.g., by including one or more sensors (not shown) in addition to sensors 110A and 110B, and are thereby configured to generate sensor data SD.

Storage device 120, otherwise referred to as one or more databases 120 in some embodiments, is one or more electromechanical devices configured to store electronic data in one or more non-transient, computer-readable storage media, the electronic data corresponding to various types of information INF. In some embodiments, information INF is referred to as a priori information.

In various embodiments, storage device 120 is configured to store the electronic data corresponding to information INF including one or more of infrastructure information 410 discussed below, e.g., with respect to FIGS. 4A, 4B, and 6, track geometry information 510 discussed below, e.g., with respect to FIG. 5, sightline information 610 discussed below, e.g., with respect to FIG. 6, or calibration landmark information 810 discussed below, e.g., with respect to FIG. 8.

Position and motion devices 130 are one or more sensing and/or other devices configured to generate positioning and motion data PMD representative of positioning and motion of vehicle 100V. Positioning includes location 100L, e.g., a three dimensional (3D) location, and an orientation of vehicle 100V relative to guideway 100G, e.g., a front-to-back direction of vehicle 100V relative to an increasing offset direction of guideway 100G. Motion includes a speed and motion direction 100M of vehicle 100V along guideway 100G. In various embodiments, position and motion devices 130 include one or more of a global positioning system (GPS), one or more motion and/or acceleration detectors, e.g. a gyroscope or a tacho-generator mounted on an axle attached to wheel 100W, or other device(s) capable of generating position and motion data PMD.

In various embodiments, position and motion devices 130 include autonomous devices and/or devices configured to generate position and motion data PMD by interacting with one or more devices (not shown) external to vehicle 100V. In some embodiments, position and motion devices 130 include or are included in a communication-based-train control (CBTC) system. In some embodiments, position and motion devices 130 include one or more of sensors 110.

Logic unit 140 is an electronic circuit electrically coupled to each of sensors 110, storage device 120, position and motion devices 130, and controller 150. In some embodiments, logic unit 140 includes one or more processing units, e.g., a central processing unit (CPU) and/or a graphical processing unit (GPU), and a non-transitory, computer readable storage medium storing a set of executable instructions configured to interface with the one or more processing units and each of sensors 110, storage device 120, position and motion devices 130, and controller 150. In some embodiments, logic unit 140 includes processor 902 and non-transitory, computer readable storage medium 904 discussed below with respect to FIG. 9.

Logic unit 140 is thereby configured to communicate with each of sensors 110, storage device 120, and position and motion devices 130 so as to receive some or all of sensor data SD, information INF, and position and motion data PMD, respectively.

In some embodiments, logic unit 140 is configured to further communicate with one or more of sensors 110, storage device 120, or position and motion devices 130 so as to control operation of the corresponding one or more of sensors 110, storage device 120, or position and motion devices 130, e.g., by sending and/or receiving one or more control signals (not labeled).

System 100 including logic unit 140 is thereby configured to, in operation, execute some or all of a method e.g., a method 200 discussed below with respect to FIGS. 2-8, of high-integrity object detection by which object detection information OBJ is generated.

Logic unit 140 is electrically coupled to controller 150 and is thereby configured to communicate object detection information OBJ to and/or from controller 150.

Controller 150 is a computing device comprising one or more processing units configured to control a portion or all of operation of vehicle 100V, e.g., through one or more of accelerating/decelerating vehicle 100V, halting motion of vehicle 100V, or coordinating motion of vehicle 100V by communicating with one or more vehicles and/or systems (not shown) external to vehicle 100V.

In some embodiments controller 150 is a safety computing device. In some embodiments, controller 150 has a checked redundant configuration having a first computing device and a second computing device. In some embodiments, controller 150 is a vital on-board controller (VOBC) of a train. In some embodiments, a VOBC is implemented by running a background process on every vital machine having safety integrity level 4 (SIL 4) in vehicle 100V which listens to communication traffic and collects key data as identified by a configuration profile of the VOBC. SIL 4 is based on International Electrotechnical Commission's (IEC) standard IEC 61508 and CENELEC EN 50126 and EN50129, and corresponds to a probability of hazards per hour ranging from $10^{-8}$ to $10^{-9}$. In some embodiments, controller 150 is controller 902 described below with respect to FIG. 9.

In some embodiments, controller 150 is configured to have a master state and logic unit 140 is configured to have a slave state. In operation, controller 150 having the master state is capable of controlling some or all of logic unit 140 and thereby some or all of system 100.

In the embodiment depicted in FIG. 1, controller 150 and logic unit 140 are separate circuits, and system 100 is thereby configured to perform high-integrity object detection operations so as to realize benefits as discussed below with respect to method 200. In some embodiments, controller 150 and logic unit 140 are components of a single controller, e.g., controller 902 discussed below with respect to FIG. 9, and system 100 is thereby configured to perform the high-integrity object detection operations. In some embodiments, system 100 includes one or more controllers in addition to logic unit 140 and/or controller 150, and system 100 thereby includes a distributed processing arrangement configured to perform the high-integrity object detection operations.

Figure 2:
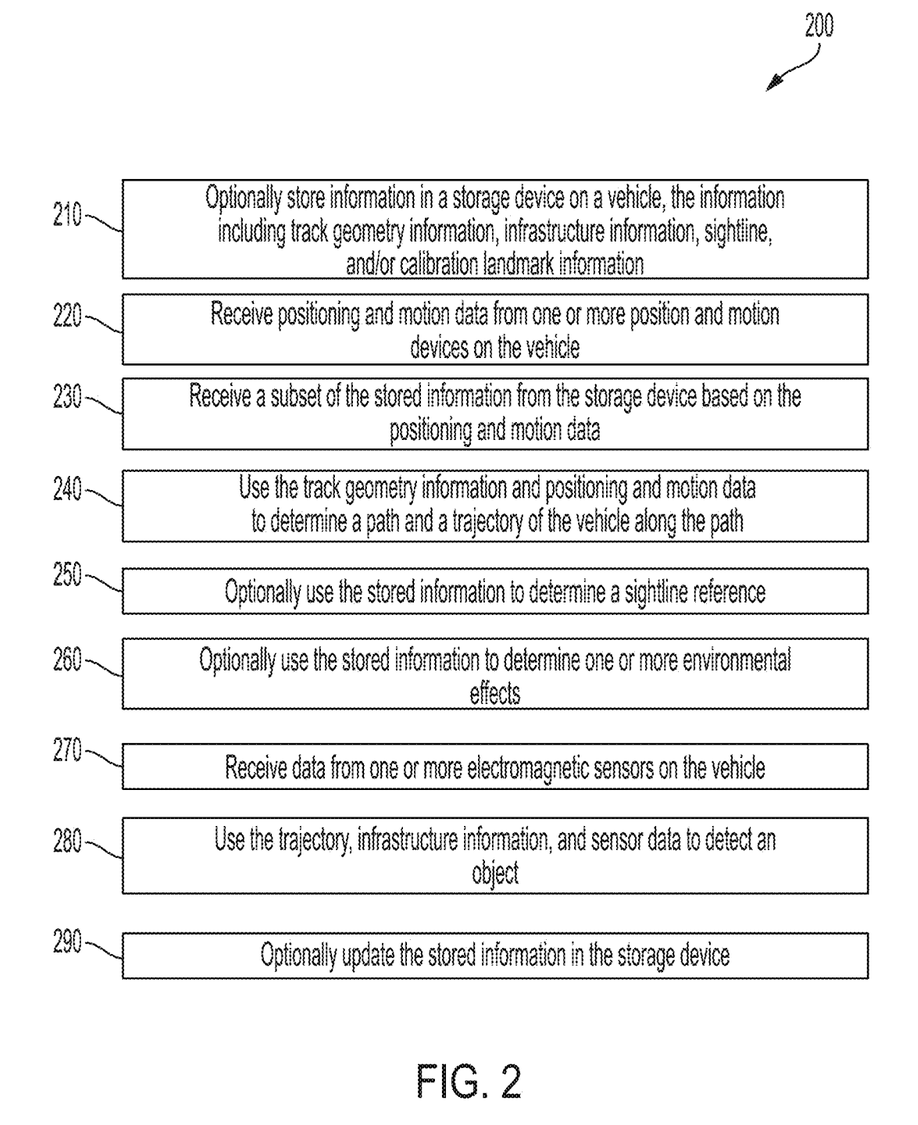
FIG. 2 is a diagram of a method of detecting an object, in some embodiments.

FIG. 2 is a diagram of method 200 of detecting an object, in some embodiments. Method 200 is usable with a high-integrity object detection system on a vehicle, e.g., system 100 on vehicle 100V discussed above with respect to FIG. 1. Some or all of the operations of method 200 are performed using a processor, e.g., logic unit 140 and/or controller 150 discussed above with respect to FIG. 1, and/or processor 902 discussed below with respect to FIG. 9.

The sequence in which the operations of method 200 are depicted in FIG. 2 is for illustration only; the operations of method 200 are capable of being executed in sequences that differ from the arrangement depicted in FIG. 2. In some embodiments, operations in addition to those depicted in FIG. 2 are performed before, between, during, and/or after the operations depicted in FIG. 2. In some embodiments, the operations of method 200 are part of controlling a vehicle, e.g., a railway car or train.

Figure 3:
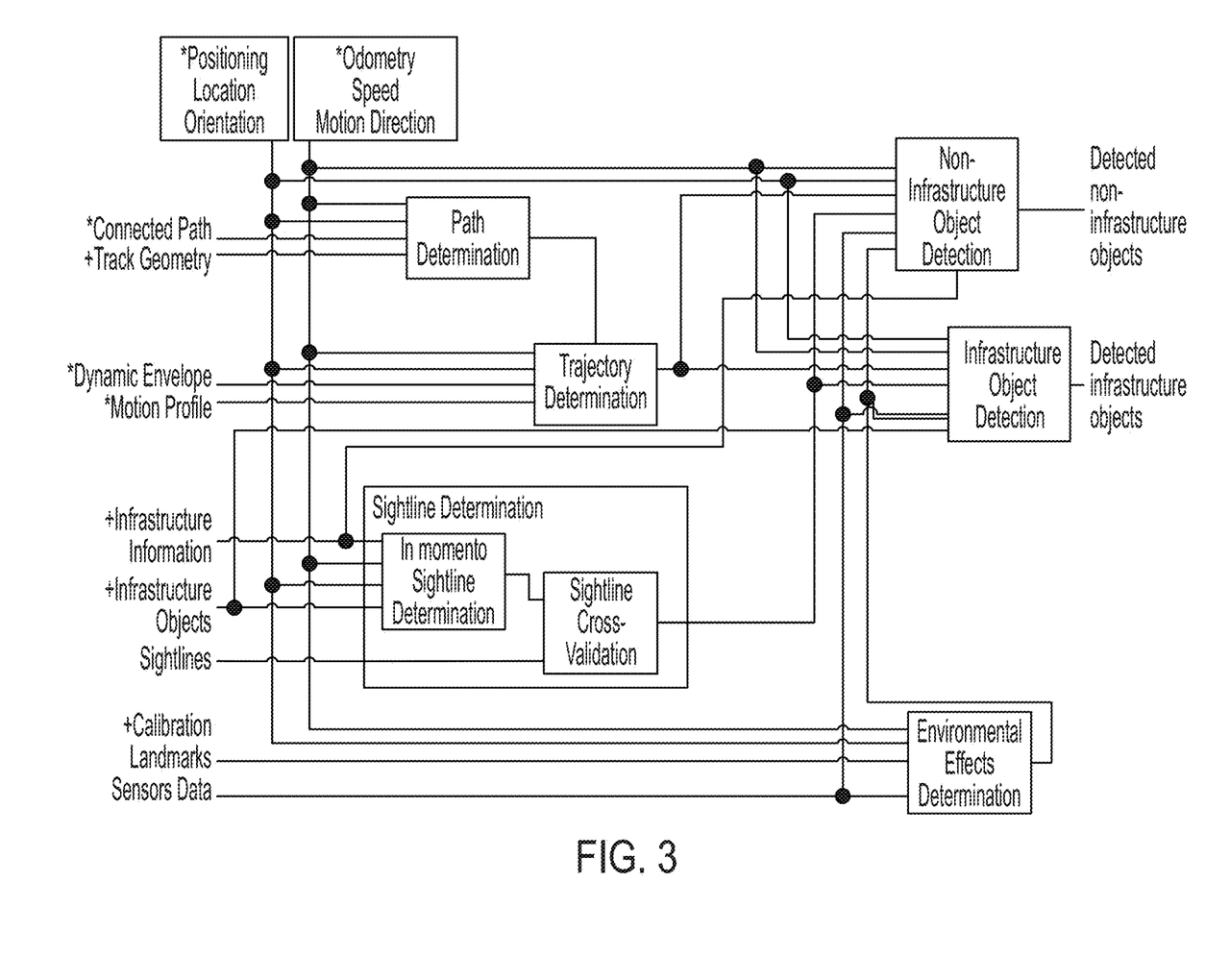
FIG. 3 is a graphical illustration of detecting an object according to one or more embodiments.

The operations of method 200 are discussed below with further reference to FIGS. 3-8. In various embodiments, FIG. 3 is a graphical illustration of detecting an object, FIG. 4A is a graphical illustration of detecting a non-infrastructure object, FIG. 4B is a graphical illustration of detecting an infrastructure object, FIG. 5 is a graphical illustration of determining a path and trajectory, FIG. 6 is a graphical illustration of determining a sightline, FIG. 7 is a schematic drawing illustrating a field of view used in object detection, and FIG. 8 is a graphical illustration of determining an environmental effect.

In the discussion below, the operations depicted in FIG. 2 are discussed generally to provide an overview of method 200, followed by more detailed discussions of the embodiments depicted in each of FIGS. 3-8.

In operation 210, in some embodiments, information is stored in a storage device on the vehicle, the information including track geometry information, infrastructure information, sightline, and/or calibration landmark information.

Track geometry information is data including 3D mathematical representations of sections of a guideway on which a vehicle travels, e.g., guideway 100G on which vehicle 100V travels, as discussed above with respect to FIG. 1. Each 3D mathematical representation corresponds to a location, e.g., location 100L discussed above with respect to FIG. 1, within a network, discussed below. In some embodiments, track geometry information includes track centerline and switch location information.

In some embodiments, the guideway includes sections of single-track guideway along which the vehicle can travel, and such sections are referred to as edges. Each edge has two endpoints referred to as nodes and is associated with an edge ID that identifies the edge and is included in the stored track geometry information. In some embodiments, the nodes correspond to switches or track terminuses. In some embodiments, the guideway includes pairs of edges configured in parallel.

A sequence of connected edges and their associated nodes forms a path, e.g., on the ground, on which the vehicle traverses as it moves. In some embodiments, this path is the physical rail-path or guideway to which a rail car motion is constrained. The sequence of edge IDs corresponding to the path is referred to as a connected path such that the path is the physical representation of the connected path information. The sequence of connected edges and associated nodes that form a given path is a subset of a network of connected edges and associated nodes, and the network includes each of the locations corresponding to the stored information.

Infrastructure information is data representative of the surroundings of the locations within the connected edges and associated nodes of the network. Infrastructure information includes geometry-based representations such as 3D point clouds, visual-textural information, e.g., camera images, and/or other suitable forms of geometrically representing the network surroundings. In some embodiments, infrastructure information includes representations other than geometry-based representations, e.g., intensity levels of light sources. Each representation corresponds to a location within the network.

Infrastructure information includes infrastructure objects, e.g., platforms, signs, or signals, identified at locations within the network. In addition to an identifier and the location, an infrastructure object includes data corresponding to size, shape, color(s), patterns, and/or other physical properties.

Sightline information is data representative of directions of unobstructed visibility at locations within the network. Sightline information is derived from infrastructure information, e.g., based on ray tracing or other calculation methods suitable for determining one or more directions of unobstructed visibility based on infrastructure information corresponding to a given location.

Calibration landmark information is data indicative of infrastructure objects usable for calibrating sensors, e.g., as part of compensating for environmental effects. In some embodiments, in addition to the location of such an infrastructure object, calibration landmark information includes one or more identifiers corresponding to object properties, calibration operations, and/or sensors corresponding to calibration operations.

In some embodiments, storing the information in the storage device includes performing one or more surveys of some or all of the network, whereby the information is obtained, appended, and/or amended. In some embodiments, storing the information in the storage device includes performing operation 290 discussed below.

In various embodiments, storing the information in the storage device includes storing the information in a single storage device, e.g., a database, storing each information type in a separate storage device, or storing combinations of information types in separate storage devices. In some embodiments, storing the information in the storage device includes storing information INF in storage device 120 discussed above with respect to FIG. 1.

In operation 220, positioning and motion data are received from one or more position and motion devices on the vehicle. Positioning and motion data are data representative of positioning and motion of the vehicle. In some embodiments, receiving the positioning and motion data includes receiving positioning and motion data PMD from position and motion devices 130 discussed above with respect to FIG. 1.

In operation 230, a subset of the stored information is received from the storage device based on the positioning and motion data. The stored information and storage device correspond to some or all of the stored information discussed above with respect to operation 210. Receiving the subset of the stored information includes using the positioning and motion data to determine one or more of the location of the vehicle within the network, an orientation of the vehicle with respect to the guideway, a speed, or motion direction of the vehicle, and receiving the subset based on the one or more of the location, orientation, speed, or motion direction.

In some embodiments, determining the location and motion direction of the vehicle include determining location 100L and motion direction 100M discussed above with respect to FIG. 1.

Receiving the subset of the stored information includes receiving portions of one or more of the track geometry information, the infrastructure information, the sightline information, or the calibration landmark information, as further discussed below with respect to FIG. 3-8.

In some embodiments, receiving the subset of the stored information includes receiving a portion of information INF from storage device 120 discussed above with respect to FIG. 1.

In operation 240, the track geometry information and positioning and motion data are used to determine a path and a trajectory of the vehicle along the path. Using the track geometry information and the positioning and motion data to determine the path includes using the location, motion, orientation, and connected path information to determine a visible connected path, and combining the visible connected path with the track geometry information, as discussed below with respect to FIG. 5.

Determining the trajectory includes determining a swept volume of the vehicle. Using the track geometry information and the positioning and motion data to determine the trajectory includes using location, motion, and orientation information, the path, and a vehicle dynamic envelope, as discussed below with respect to FIG. 5.

In some embodiments, using the track geometry information and the positioning and motion data includes using information INF and positioning and motion data PMD discussed above with respect to FIG. 1. In some embodiments, using the track geometry information includes using track geometry information 510 discussed below with respect to FIG. 5.

In operation 250, in some embodiments, the stored information is used to determine a sightline reference. Using the stored information to determine the sightline reference includes using stored sightline information based on the location and motion direction determined by the positioning and motion data. In some embodiments, using the stored information to determine the sightline reference includes validating the stored sightline information by deriving one or more sightlines from stored infrastructure information as discussed below with respect to FIGS. 6 and 7.

In some embodiments, using the stored information includes using information INF discussed above with respect to FIG. 1. In some embodiments, using the stored information includes using infrastructure information 410 and sightline information 610 discussed below with respect to FIGS. 6 and 7.

In operation 260, in some embodiments, the stored information is used to determine one or more environmental effects. Using the stored information to determine one or more environmental effects includes using stored calibration landmark information based on the location and motion direction determined by the positioning and motion data to characterize environmental influence on data received from one or more sensors, e.g., sensors 110 discussed above with respect to FIG. 1. In some embodiments, characterizing the environmental influence includes assigning one or more weights to the data received from the one or more sensors based on a comparison between the stored calibration landmark information and the received data.

In some embodiments, using the stored information includes using information INF discussed above with respect to FIG. 1. In some embodiments, using the stored information includes using calibration landmark information 810 discussed below with respect to FIG. 8.

In operation 270, sensor data are received from one or more electromagnetic sensors on the vehicle. Receiving the sensor data from the one or more electromagnetic sensors includes receiving the sensor data representative of the environment in the vicinity of the vehicle.

In some embodiments, receiving the sensor data from the one or more electromagnetic sensors includes receiving sensor data SD from electromagnetic sensors 110 discussed above with respect to FIG. 1.

In operation 280, the trajectory, infrastructure information, and sensor data are used to detect an object. Using the trajectory and infrastructure information includes using a portion of the infrastructure information received in operation 230 within the trajectory determined in operation 240. Using the sensor data includes, for each of some or all of the one or more electromagnetic sensors, comparing the sensor data to the infrastructure information portion, and determining that the object exists based on a difference between the sensor data and the infrastructure information portion.

In some embodiments, using the trajectory, infrastructure information, and sensor data to detect an object includes detecting a non-infrastructure object, as discussed below with respect to FIGS. 3 and 4A. Non-limiting examples of non-infrastructure objects include persons, animals, other vehicles (including trains and other types of rail vehicles), trees, rocks, earth, snow, ice, flood, water, masts, pylons, fire, or smoke.

In some embodiments, using the trajectory, infrastructure information, and sensor data to detect an object includes detecting an infrastructure object, as discussed below with respect to FIGS. 3 and 4B. Non-limiting examples of infrastructure objects include platforms, signals, signs, or other wayside structures.

In some embodiments, using the infrastructure information includes using infrastructure information 410 discussed below with respect to FIGS. 3-8. In some embodiments, using the infrastructure information and sensor data includes using information INF and sensor data SD discussed above with respect to FIG. 1.

In operation 290, in some embodiments, some or all of the positioning and motion data or the sensor data are used to update the stored information in the storage device. In some embodiments, using some or all of the positioning and motion data or the sensor data includes using some or all of positioning and motion data PMD or sensor data SD discussed above with respect to FIG. 1.

Updating the stored information in the storage device includes updating some or all of the track geometry, infrastructure, sightline, or calibration landmark information. In some embodiments, updating the stored information in the storage device includes updating information INF in storage device 120 discussed above with respect to FIG. 1.

In some embodiments, updating the stored information is based on one or more differences between the stored information and the environment in the vicinity of the vehicle represented by the positioning and motion data or the sensor data, e.g., a sign or signal represented in the stored information being different from a replacement sign or signal represented by the sensor data.

In some embodiments, updating the stored information is in response to an input, e.g., an output generated by an algorithm or one or more signals received from a user interface in response to an operator.

Each of FIGS. 3-8 illustrates data flow corresponding to the operations of method 200 in accordance with some embodiments. FIGS. 3-8 include functions and sub-functions discussed below, each representing a combination of hardware and/or software configured in accordance with the operations of method 200 and the various embodiments depicted in FIGS. 1 and 9.

FIGS. 3-8 include data corresponding to stored information (designated in FIG. 3 by the symbol "+"), data corresponding to positioning and motion data (designated in FIG. 3 by the symbol "*"), and sensors data. In some embodiments, stored information data are referred to as a priori information, positioning and motion data are referred to as in memento information, and/or sensors data are referred to as in memento sensors data. Non-limiting examples include, respectively, stored information INF, positioning and motion information PMD, and sensor data SD, each discussed above with respect to FIG. 1.

In the embodiment depicted in FIG. 3, stored information data include track geometry, infrastructure information, infrastructure objects, sightlines, and calibration landmarks, each discussed above.

Positioning data include location and orientation data discussed above, and connected path data. Connected path data are data indicative of a present edge ID of a sequence of edge IDs corresponding to the vehicle's expected, e.g., authorized, traversal within the network of edges and associated nodes. In some embodiments, connected path data are received from a CBTC system.

Motion data include speed and motion direction, designated as odometry data in FIG. 3 and discussed above, and dynamic envelope and motion profile data. Dynamic envelope data are data representative of a volume of space occupied by and surrounding the vehicle over a given period of time for a given speed. Motion profile data are data indicative of the vehicle's expected speed at given times and/or locations throughout the traversal within the network of edges and associated nodes. In some embodiments, one or both of dynamic envelope data or motion profile data are received from a CBTC system.

Figure 5:
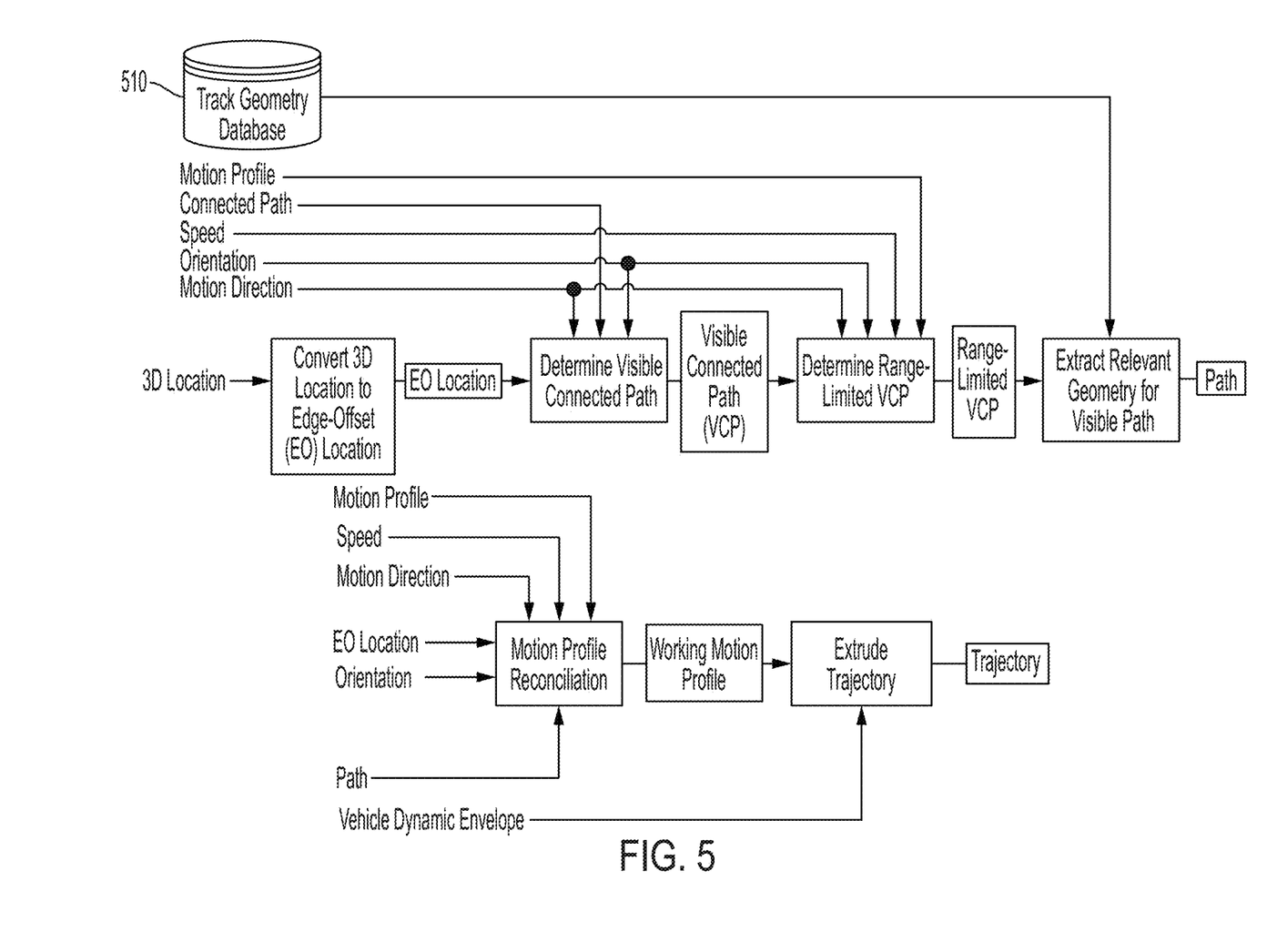
FIG. 5 is a graphical illustration of determining a path and trajectory according to one or more embodiments.

As depicted in FIG. 3 and further depicted in FIG. 5, a path determination function is configured to generate path data based on positioning, odometry, connected path, and track geometry data, and a trajectory determination function is configured to generate trajectory data based on the positioning, odometry, dynamic envelope, motion profile, and path data.

Figure 6:
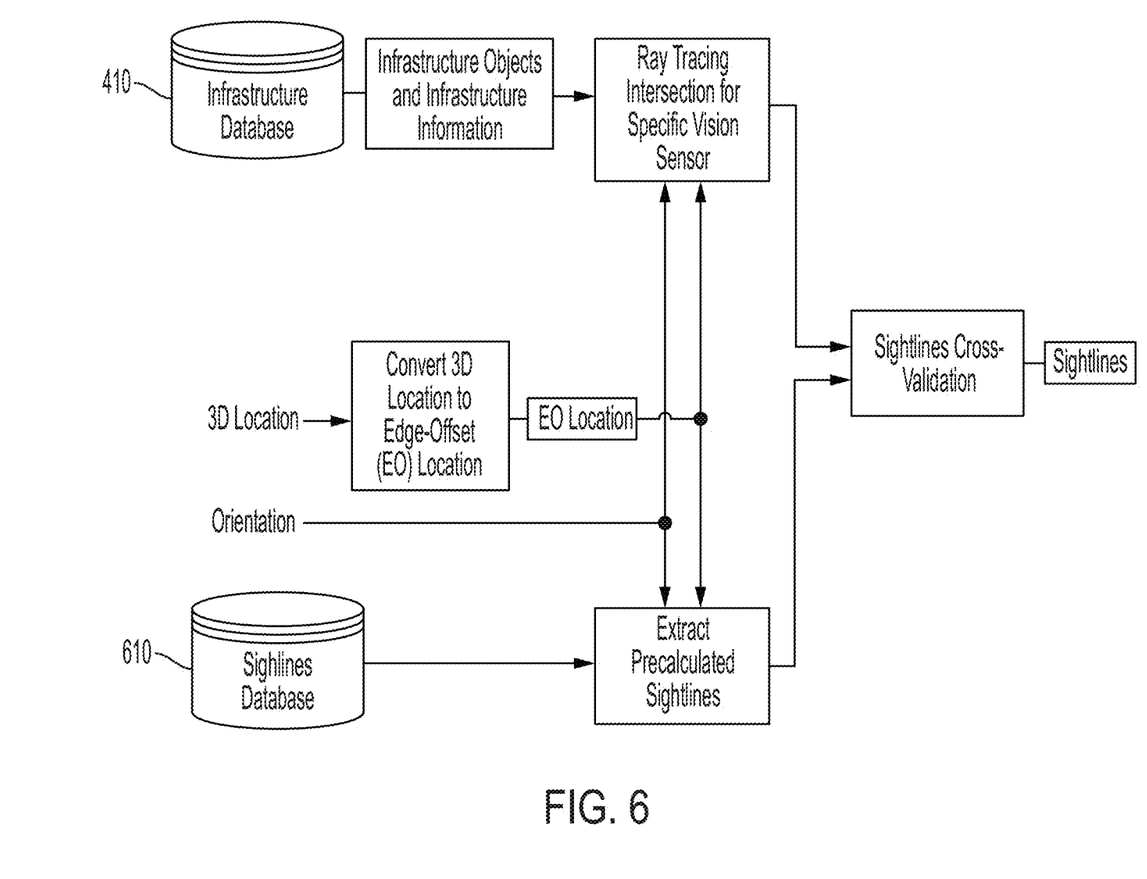
FIG. 6 is a graphical illustration of determining a sightline according to one or more embodiments.
Figure 7:
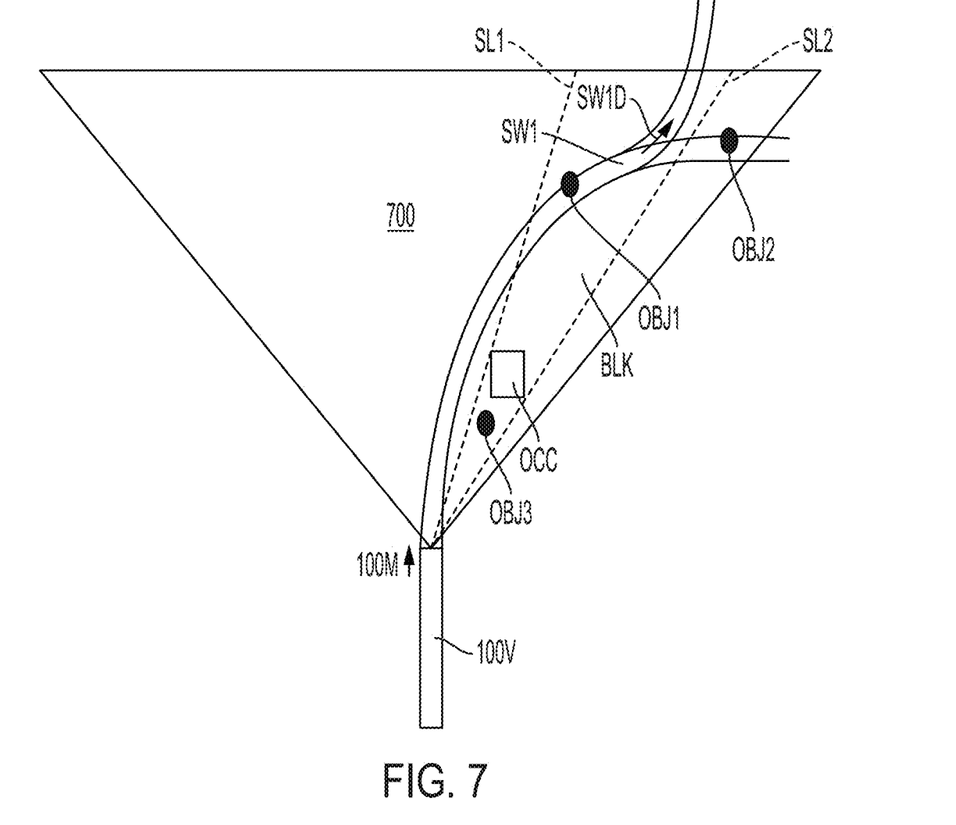
FIG. 7 is a schematic drawing illustrating a field of view used in object detection, in some embodiments.

As depicted in FIG. 3 and further depicted in FIGS. 6 and 7, in some embodiments, a sightline determination function is configured to generate sightline data based on the positioning, odometry, infrastructure, infrastructure object, and sightline data.

Figure 8:
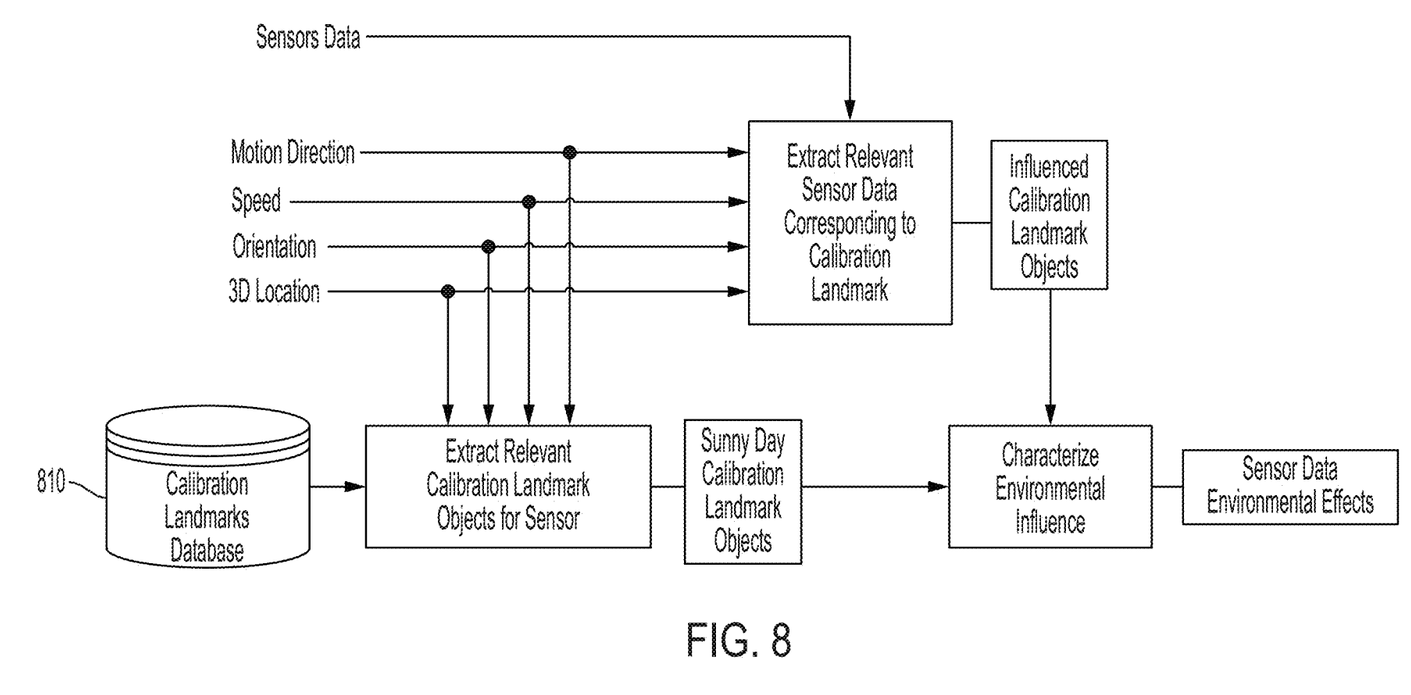
FIG. 8 is a graphical illustration of determining an environmental effect according to one or more embodiments.

As depicted in FIG. 3 and further depicted in FIG. 8, in some embodiments, an environmental effects determination function is configured to generate sensors data environmental effects data based on the positioning, odometry, calibration landmark, and sensors data.

Figure 4A:
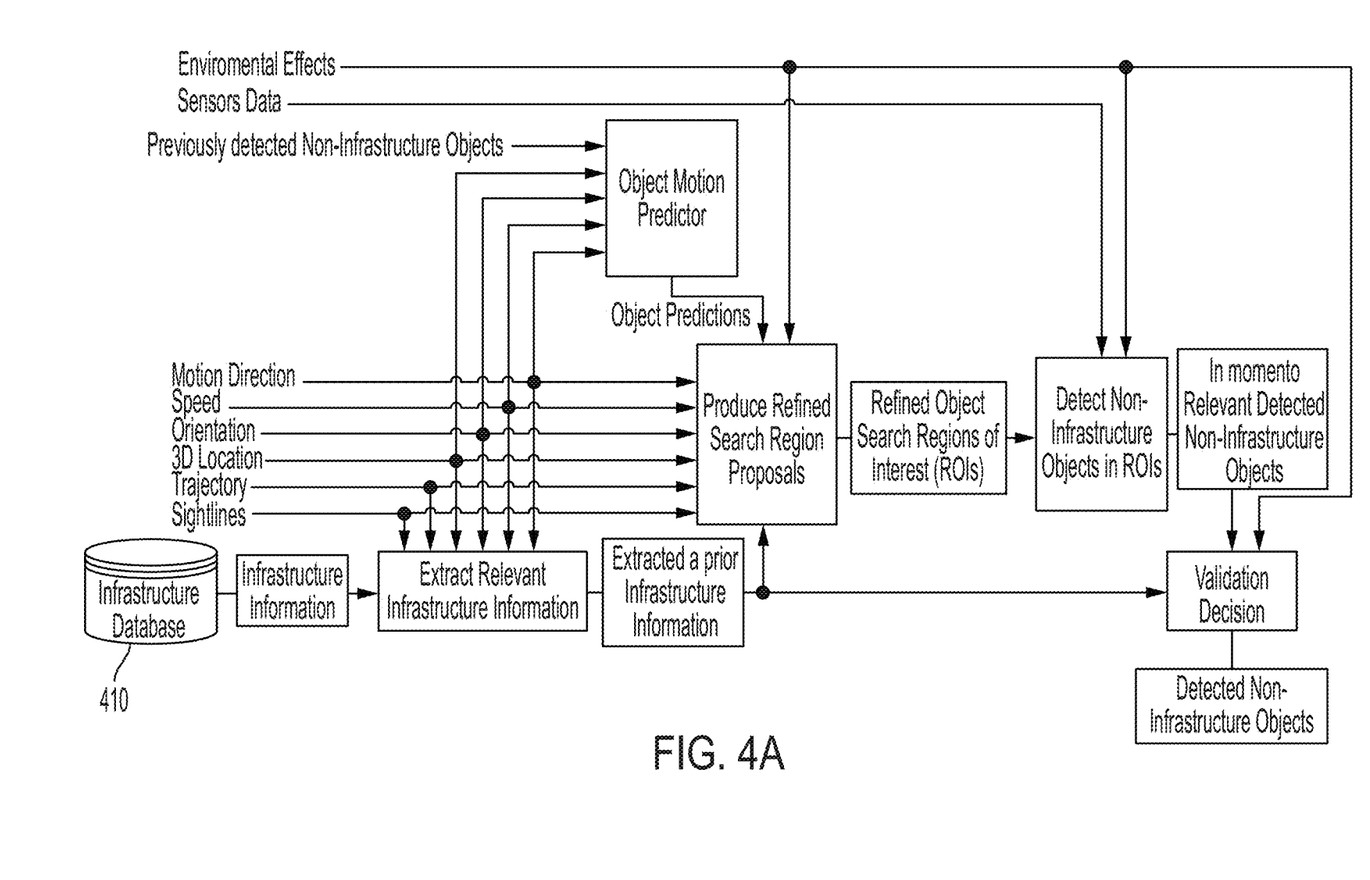
FIG. 4A is a graphical illustration of detecting a non-infrastructure object according to one or more embodiments.

As depicted in FIGS. 3 and 4A, in some embodiments, a non-infrastructure object detection function is configured to generate detected non-infrastructure object data based on the positioning, odometry, trajectory, sightline (if present), sensors, environmental effects (if present), and infrastructure data.

The non-infrastructure object detection function includes an extraction sub-function, an object motion predictor sub-function, a search region sub-function, a non-infrastructure object detection sub-function, and, in some embodiments, a validation decision sub-function.

The extraction sub-function is configured to generate extracted a priori infrastructure information by extracting a relevant portion of infrastructure information 410 based on the motion direction, speed, orientation, 3D location, trajectory, and (if present) sightlines data.

The object motion predictor sub-function is configured to generate object prediction data based on previously detected non-infrastructure object data and the motion direction, speed, orientation, and 3D location data.

The search region sub-function is configured to generate refined object search regions of interest (ROI) based on the (if present) environmental effects, object prediction, motion direction, speed, orientation, 3D location, trajectory, and (if present) sightlines data, and the extracted a priori infrastructure information.

The non-infrastructure object detection sub-function is configured to generate relevant detected non-infrastructure object data based on the (if present) environmental effects and sensors data, and the refined object search ROI.

If present, the validation decision sub-function is configured to generate detected non-infrastructure object data by performing a validation operation using the (if present) environmental effects data, the relevant detected non-infrastructure object data, and the extracted a priori infrastructure information. In some embodiments, the non-infrastructure object detection function does not include the validation decision sub-function and is instead configured to generate the relevant detected non-infrastructure object data as the detected non-infrastructure object data without performing the validation operation.

Figure 4B:
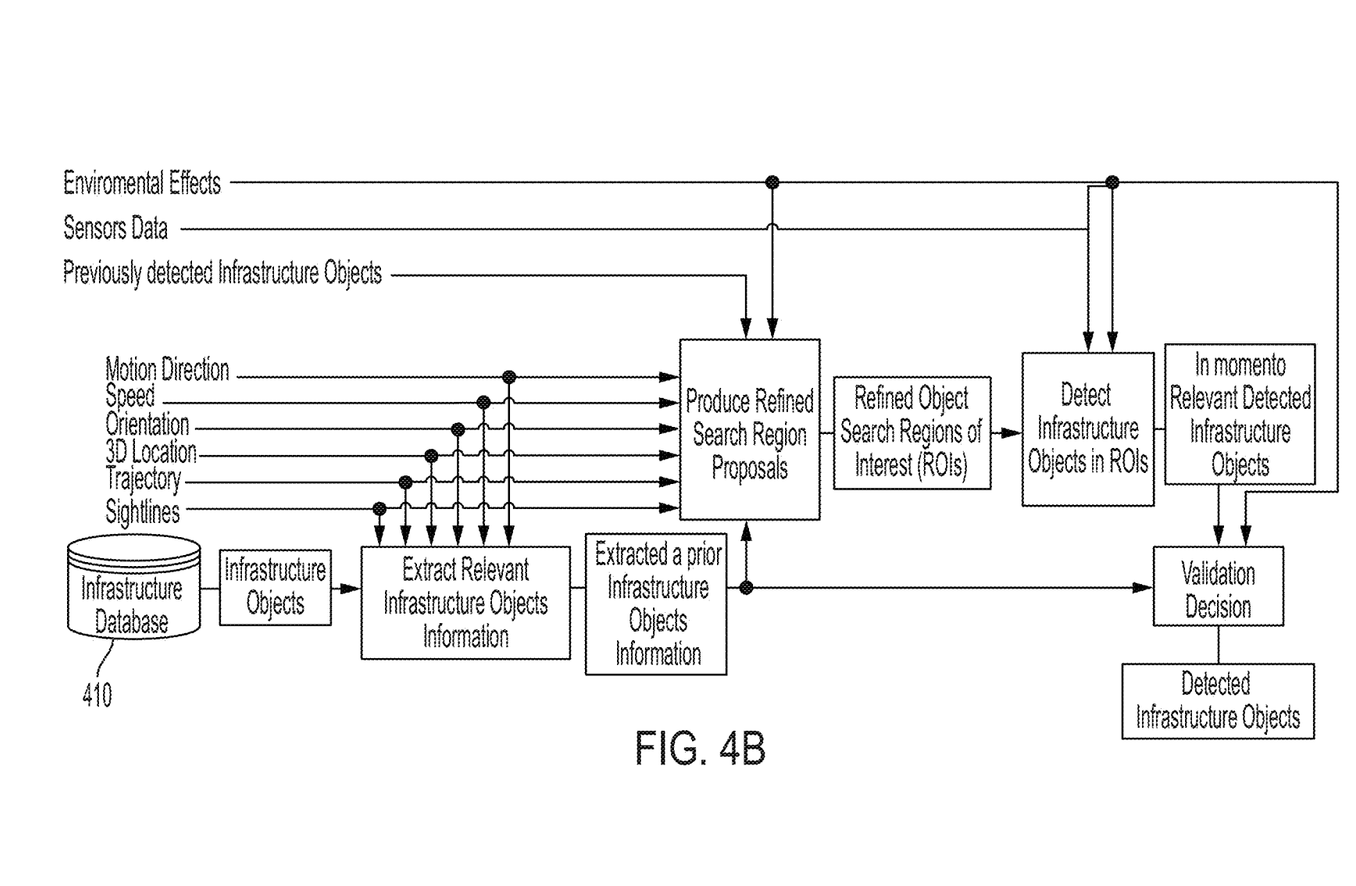
FIG. 4B is a graphical illustration of detecting an infrastructure object according to one or more embodiments.

As depicted in FIGS. 3 and 4B, in some embodiments, an infrastructure object detection function is configured to generate detected infrastructure object data based on the positioning, odometry, trajectory, sightline (if present), sensors, environmental effects (if present), and infrastructure object data.

The infrastructure object detection function includes each of the extraction, search region, and, in some embodiments, validation sub-functions discussed above with respect to FIGS. 3 and 4A. Instead of the non-infrastructure object detection sub-function, the infrastructure object detection function includes an infrastructure object detection sub-function.

The extraction sub-function is configured to generate extracted a priori infrastructure objects information by extracting a relevant portion of infrastructure information 410 based on the motion direction, speed, orientation, 3D location, trajectory, and (if present) sightlines data.

The search region sub-function is configured to generate the refined object search ROI based on previously detected infrastructure object data, the (if present) environmental effects, motion direction, speed, orientation, 3D location, trajectory, and (if present) sightlines data, and the extracted a priori infrastructure objects information.

The infrastructure object detection sub-function is configured to generate relevant detected infrastructure object data based on the (if present) environmental effects and sensors data, and the refined object search ROI.

If present, the validation decision sub-function is configured to generate detected infrastructure object data by performing a validation operation using the (if present) environmental effects data, the relevant detected infrastructure object data, and the extracted a priori infrastructure object information. In some embodiments, the infrastructure object detection function does not include the validation decision sub-function and is instead configured to generate the relevant detected infrastructure object data as the detected infrastructure object data without performing the validation operation.

Each of the non-infrastructure object detection function and infrastructure object detection function is thereby configured to detect an object using the trajectory, infrastructure information, and sensor data in accordance with operation 280 discussed above.

As depicted in FIG. 5, the path determination function includes an edge-offset (EO) location sub-function, a visible connected path (VCP) sub-function, a range-limited VCP sub-function, and a geometry extraction sub-function.

The EO location sub-function is configured to generate an EO location by converting 3D location data into location data based on an offset distance from a node along an edge.

The VCP sub-function is configured to determine VCP data based on the motion direction, connected path, orientation, and EO location data.

The range-limited VCP sub-function is configured to generate range-limited VCP data as a subset of the VCP data based on the motion profile data.

The geometry extraction sub-function is configured to generate path data by extracting relevant track geometry data from track geometry information 510 based on the range-limited VCP.

The path determination function is thereby configured to determine the path by using the track geometry information and positioning and motion data in accordance with operation 240 discussed above.

As further depicted in FIG. 5, the trajectory determination function includes a motion profile reconciliation sub-function and a trajectory extrusion sub-function.

The motion profile reconciliation sub-function is configured to generate a working motion profile based on the motion profile, speed, motion direction, EO location, orientation, and path data.

The trajectory extrusion sub-function is configured to generate trajectory data based on the working motion profile and the vehicle dynamic envelope data.

The trajectory determination function is thereby configured to determine the trajectory of the vehicle along the path by using the track geometry information and positioning and motion data in accordance with operation 240 discussed above.

As depicted in FIG. 6, the sightlines function includes the EO location sub-function discussed above with respect to FIG. 5, a sightline calculation sub-function in some embodiments, a sightline extraction sub-function, and a sightline validation sub-function in some embodiments. In some embodiments, the sightlines function does not include the EO location sub-function and receives EO location data from the path determination or trajectory determination function.

If present, the sightline calculation sub-function is configured to calculate, e.g., by ray tracing, first sightline data from infrastructure objects and infrastructure information extracted from infrastructure information 410 based on the EO location and orientation data.

The sightline extraction sub-function is configured to extract second sightline data from sightline information 610 based on the EO location and orientation data.

If present, the sightline validation sub-function is configured to generate sightline data by performing a validation operation using the first and second sightline data. In some embodiments, the sightlines function does not include the sightline validation sub-function and is instead configured to generate the second sightline data as the sightline data without performing the validation operation.

The sightlines function is thereby configured to determine a sightline reference by using the stored information in accordance with operation 250 discussed above.

FIG. 7 depicts a non-limiting example of a field of view (FOV) 700 used in object detection in some embodiments. In addition to FOV 700, FIG. 7 includes vehicle 100V and motion direction 100M discussed above with respect to FIG. 1, objects OBJ1, OBJ2, and OBJ3, an occlusion OCC, sightlines SL1 and SL2, a FOV portion BLK, and a switch SW1 having a switch direction SW2.

FOV 700 represents sensor data corresponding to a given electromagnetic sensor, e.g., sensor data SD corresponding to sensor 110 discussed above with respect to FIG. 1, obtained based on a location and orientation (not labeled) of vehicle 100V and motion direction 100M.

Occlusion OCC is a representation of an infrastructure object, e.g., an electric utility box, extracted from infrastructure object information based on the location and motion direction 100M. Sightlines SL1 and SL2 are sightline data generated by the sightline function based on occlusion OCC such that occlusion OCC and sightlines SL1 and SL2 collectively define FOV portion BLK as a blocked portion of FOV 700, the remaining portion of FOV having unobstructed visibility.

Object OBJ3 is between occlusion OCC and vehicle 100V and is thereby capable of being detected based on the sensor data corresponding to FOV 700. Object OBJ1 is located within FOV portion BLK and is thereby not capable of being detected based on the sensor data corresponding to FOV 700. Based on the sightline data, the non-infrastructure or infrastructure object detection function is aware of FOV portion BLK and generates the corresponding non-infrastructure or infrastructure object data such that control of vehicle 100V can compensate for FOV portion BLK, e.g., by slowing vehicle 100V to allow for the possible presence of an obscured object, e.g., object OBJ1. Based on the sightline data, the corresponding non-infrastructure or infrastructure object detection function is thereby capable of safely compensating for objects both detected and potentially obscured from received sensor data.

Switch SW1 is located within FOV portion BLK and is thereby not capable of being detected based on the sensor data corresponding to FOV 700. Because switch SW1 and switch direction SW1D are known based on connected path data, the non-infrastructure or infrastructure object detection function is aware of the connected path continuing beyond switch SW1. Object OBJ1 is within FOV 700 but located away from the connected path corresponding to vehicle 100V. Based on the sightline and connected path data, the corresponding non-infrastructure or infrastructure object detection function is thereby able to avoid falsely identifying object OBJ2 as a danger to vehicle 100V.

As depicted in FIG. 5, the environmental effects determination function includes a calibration landmark object extraction sub-function, a sensor data extraction sub-function, and an environmental influence characterization sub-function.

The calibration landmark object extraction sub-function is configured to generate uninfluenced calibration landmark objects (designated as "sunny day" in FIG. 8) by extracting relevant calibration landmark object data from calibration landmark information 810 based on the 3D location, orientation, speed, and motion direction data.

The sensor data extraction sub-function is configured to generate potentially influenced calibration landmark objects by extracting sensor data relevant to calibration landmark objects from the sensor data based on the 3D location, orientation, speed, and motion direction data.

The environmental influence characterization sub-function is configured to generate sensor data environmental effects data by characterizing an environmental influence, e.g., by assigning one or more weights, based on a comparison between the uninfluenced calibration landmark objects and the potentially influenced calibration landmark objects.

The environmental effects determination function is thereby configured to determine one or more environmental effects by using the stored information in accordance with operation 260 discussed above.

By executing some or all of method 200, e.g., including some or all of the embodiments depicted in FIGS. 3-8, an object is detected by combining on-board stored information with real-time data to determine a vehicle path and trajectory, and using the trajectory, stored information, and sensor data to detect infrastructure and non-infrastructure objects. Compared to other known approaches, the system and method enable high-integrity object detection with reduced complexity, processing overhead, and characterization uncertainty.

Figure 9:
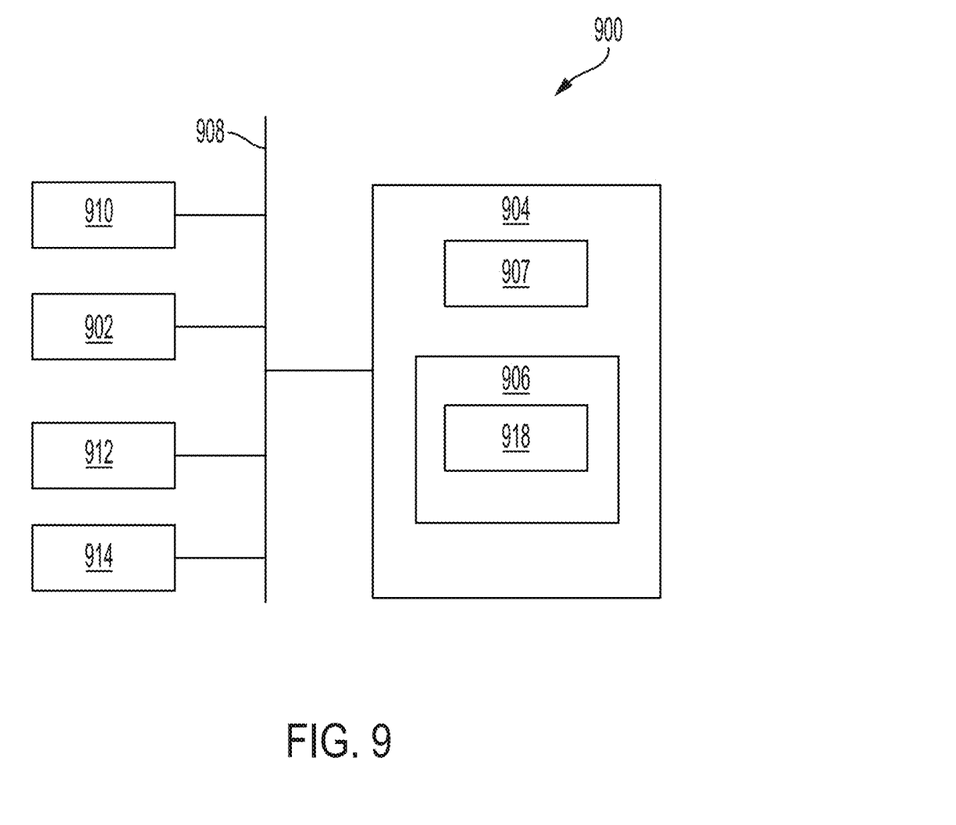
FIG. 9 is a block diagram of a controller usable in accordance with one or more embodiments.

FIG. 9 is a block diagram of a controller 900 configured for a method of performing high-integrity object detection for vehicles using a priori information in accordance with one or more embodiments (hereinafter "the method"), e.g., method 200 discussed above with respect to FIGS. 2-8. In some embodiments, controller 900 is an on-board controller for a vehicle. Controller 900 is usable as one or both of logic unit 140 or controller 150, each discussed above with respect to FIG. 1.

Controller 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with elements of controller 900. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting and communicating to external elements via network 914. In some embodiments, network interface 912 is replaced with a different communication path such as optical communication, microwave communication, inductive loop communication, or other suitable communication paths. The processor 902 is configured to execute the computer program code 906 encoded in the computer readable storage medium 904 in order to cause controller 900 to be usable for performing a portion or all of the operations as described with respect to the method.

In some embodiments, the processor 902 is a central processing unit (CPU), a multi-processor, a distributed processing system, an application specific integrated circuit (ASIC), and/or a suitable processing unit. In some embodiments, processor 902 is configured to receive master/slave information signals via network interface 912. In some embodiments, processor 902 is configured to generate master/slave control information signals for transmitting to external circuitry via network interface 912.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD). In some embodiments, the computer readable storage medium 904 is part of an embedded microcontroller or a system on chip (SoC).

In some embodiments, the storage medium 904 stores the computer program code 906 configured to cause controller 900 to perform some or all of the operations as described with respect to the method. In some embodiments, the storage medium 804 also stores information needed for performing the operations as described with respect to the method, and/or a set of executable instructions to perform some or all of the operations as described with respect to the method.

Controller 900 includes I/O interface 910. I/O interface 910 is coupled to external circuitry. In some embodiments, I/O interface 910 is configured to receive instructions from a port in an embedded controller. In some embodiments, I/O interface 910 includes one or more inputs configured to allow verification of the status of one or more system elements as described with respect to the method.

Controller 900 also includes network interface 912 coupled to the processor 902. Network interface 912 allows Controller 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, IEEE-1394, or asynchronous or synchronous communications links, such as RS485, CAN or HDLC. In some embodiments, the operations as described with respect to controller 900 are implemented in two or more systems, and information such as master/slave information is exchanged between different controller 900 via network 914.

Controller 900 is configured to receive data related to the method from a user or an external circuit. The data are transferred to processor 902 via bus 908 and stored in computer readable medium 904 as one or more parameters 918. During operation, processor 902 executes a set of instructions to perform high-integrity object detection as described above with respect to the method.

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and operations described in the specification. As one of ordinary skill in the art will readily appreciate from the disclosure of the present invention, processes, machines, manufacture, compositions of matter, means, methods, or operations, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or operations.

What is claimed is:

1. A method of performing a detection operation, the method comprising:
   receiving positioning and motion information from one or more positioning and motion devices on a vehicle on a guideway;
   based on the positioning and motion information, receiving information from a database on the vehicle, the information comprising track geometry information and infrastructure information representative of one or more objects external to the guideway and within surroundings of locations along the guideway;
   using the track geometry information and positioning and motion information to determine a path of the guideway and a trajectory of the vehicle along the path;
   receiving data from one or more electromagnetic sensors on the vehicle; and
   detecting an object by using the trajectory, the infrastructure information, and the information from the one or more electromagnetic sensors.

2. The method of claim 1, wherein the track geometry information comprises a three dimensional (3D) mathematical representation of a section of the guideway corresponding to location data of the positioning and motion information.

3. The method of claim 1, wherein the determining the trajectory comprises determining a dynamic envelope of the vehicle based on the path and the positioning and motion information.

4. The method of claim 1, wherein the detecting the object by using the trajectory and the infrastructure information comprises using a portion of the infrastructure information within the trajectory.

5. The method of claim 1, wherein the detecting the object by using the trajectory and the infrastructure information comprises performing a validation operation based on the received infrastructure information.

6. The method of claim 1, wherein the detecting the object comprises detecting a non-infrastructure object.

7. The method of claim 1, wherein the detecting the object comprises detecting an object corresponding to the received infrastructure information.

8. The method of claim 1, further comprising determining one or more environmental effects based on the information, wherein the detecting the object is based on the one or more environmental effects.

9. The method of claim 1, further comprising determining one or more sightlines based on the information, wherein the detecting the object is based on the one or more sightlines.

10. The method of claim 1, further comprising storing the information in the database based on performing one or more surveys.

11. A method of performing a detection operation, the method comprising:
receiving positioning and motion information from one or more positioning and motion devices on a vehicle on a guideway;
based on the positioning and motion information, receiving information from a database on the vehicle, the information comprising track geometry information, infrastructure information representative of one or more objects external to the guideway and within surroundings of locations along the guideway, and sightline information corresponding to the guideway;
using the track geometry information and positioning and motion information to determine a path of the guideway and a trajectory of the vehicle along the path;
receiving data from one or more electromagnetic sensors on the vehicle; and
detecting an object by using the trajectory, the infrastructure information, the sightline information, and the information from the one or more electromagnetic sensors.

12. The method of claim 11, wherein the receiving each of the track geometry information, the infrastructure information, and the sightline information is based on location, orientation, and motion direction data of the positioning and motion information.

13. The method of claim 11, wherein the sightline information is derived from the infrastructure information based on a ray tracing calculation.

14. The method of claim 11, wherein the detecting the object using the sightline information comprises performing a validation operation on the sightline operation based on the infrastructure information.

15. A detection system comprising:
a database;
one or more positioning and motion devices;
one or more electromagnetic sensors; and
a logic unit configured to:
receive positioning and motion information from the one or more positioning and motion devices, the positioning and motion information corresponding to a vehicle hosting the detection system and configured to travel along a guideway;
based on the positioning and motion information, receive information from the database, the information comprising track geometry information and infrastructure information representative of one or more objects external to the guideway and within surroundings of locations along the guideway;
determine a trajectory of the vehicle along a path of the guideway based on the track geometry information and positioning and motion information; and
detect an object based on the infrastructure information, the trajectory, and data received from the one or more electromagnetic sensors.

16. The detection system of claim 15, wherein the information received from the database is extracted based on location, orientation, and motion direction data of the positioning and motion information.

17. The detection system of claim 15, wherein the logic unit is configured to determine the trajectory by converting three-dimensional location data to edge-offset location data.

18. The detection system of claim 15, wherein the logic unit is configured to
determine one or more sightlines based on sightline information in the information received from the database, and
detect the object further based on the one or more sightlines.

19. The detection system of claim 15, wherein the logic unit is configured to
determine one or more environmental effects based on calibration landmark information in the information received from the database, and
detect the object further based on the one or more environmental effects.

20. The detection system of claim 15, wherein
the vehicle comprises a rail-based train car, and
the guideway comprises a pair of tracks.

* * * * *